Feb. 27, 1973  C. C. ATKINSON ET AL  3,717,929
METHOD OF MAKING ALKALI METAL-FILLED ELECTRICAL
CONDUCTORS AND TERMINATIONS THEREFOR
Filed June 3, 1970  2 Sheets-Sheet 1

INVENTORS:
CLIFF C. ATKINSON
ROLAND O. BUTLER
FRANCIS J. ROSS

BY Amos G. Cole

AGENT

Feb. 27, 1973   C. C. ATKINSON ET AL   3,717,929
METHOD OF MAKING ALKALI METAL-FILLED ELECTRICAL
CONDUCTORS AND TERMINATIONS THEREFOR
Filed June 3, 1970   2 Sheets-Sheet 2
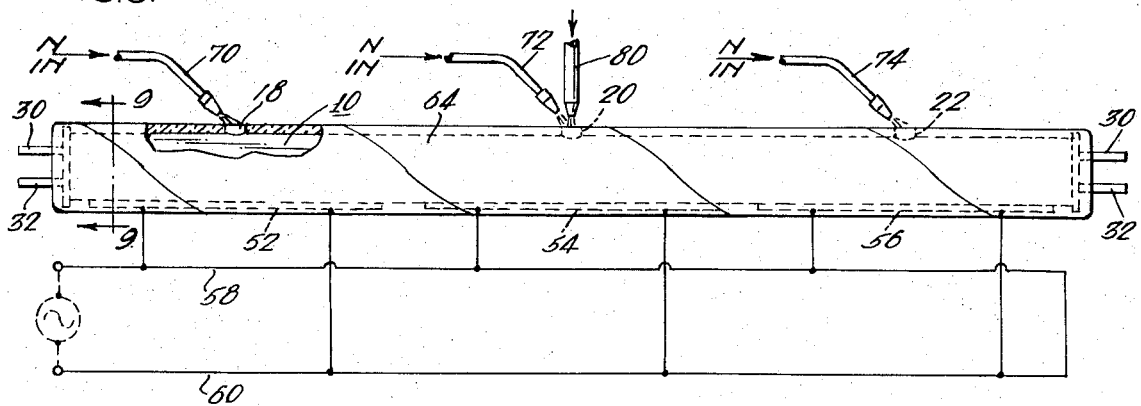
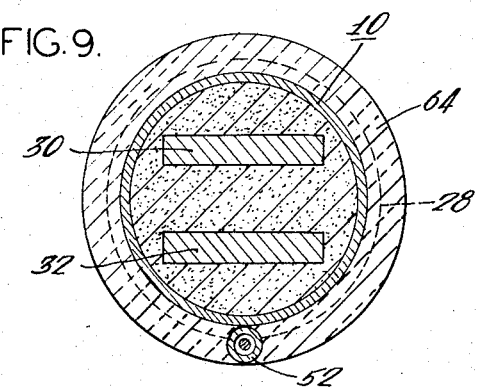
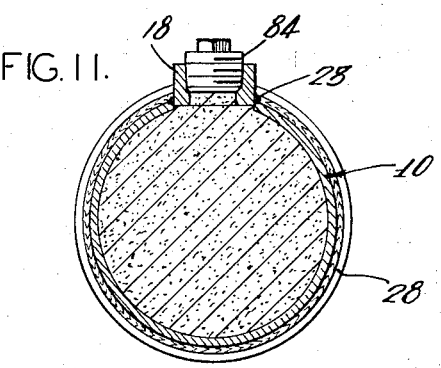
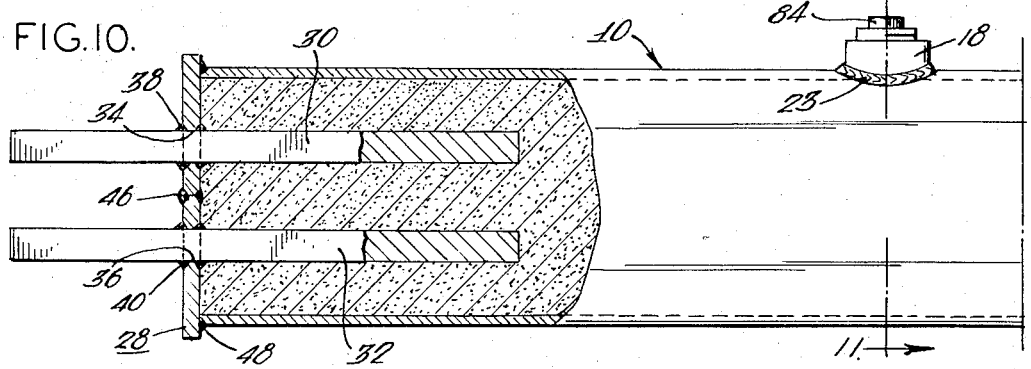
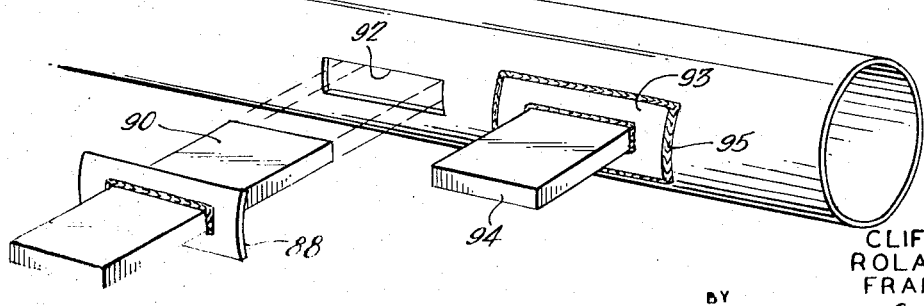
INVENTORS
CLIFF C. ATKINSON
ROLAND O. BUTLER
FRANCIS J. ROSS
BY
AGENT

United States Patent Office 3,717,929
Patented Feb. 27, 1973

3,717,929
METHOD OF MAKING ALKALI METAL-FILLED ELECTRICAL CONDUCTORS AND TERMINATIONS THEREFOR
Cliff C. Atkinson, Niagara Falls, Rolland O. Butler, Grand Island, and Francis J. Ross, Niagara Falls, N.Y., assignors to E. I. du Pont de Nemours and Company, Wilmington, Del.
Filed June 3, 1970, Ser. No. 43,043
Int. Cl. H01b 13/00
U.S. Cl. 29—624
10 Claims

ABSTRACT OF THE DISCLOSURE

A method of fabricating a sodium-filled conductor with low-resistance copper terminations by welding copper inserts, which are to provide the desired terminations, into an aperture in a support of a material which is readily weldable to steel but more difficult to weld to copper, the support being of relatively small size, however, so that the copper insert can be readily hermetically joined to the support by welding. The support is then positioned so as to close an opening in a steel casing and welded thereto with the insert extending from the interior to the exterior of the casing. The casing is cleaned internally and molten sodium is flowed into it in an environment of an inert gas while maintaining the casing at a temperature above the melting point of sodium, until the casing is filled and the portions of the copper inserts extending inside the casing are immersed in the molten sodium. Thereafter the casing and the molten sodium are cooled to solidify the sodium and to provide an intimate low-resistance contact between the solidified sodium and the portion of the insert within the casing. All openings through the casing are hermetically sealed after it has been filled with the sodium. Low-resistance terminations are thereby provided readily and reproducibly.

BACKGROUND OF THE INVENTION

This invention relates to methods for the fabrication of alkali metal-filled electrical conductors having low-resistance terminations for enabling suitable electrical connection thereto, and especially to such conductors of the type suitable for carrying extremely large currents.

There are a variety of applications in which it is desirable to provide conductors capable of conducting extremely large electrical currents, e.g. tens of thousands of amperes. Such a conductor, or high-current carrying bus, is particularly useful in distributing large currents to industrial installations, such as those using large numbers of electrolysis cells to produce sodium or aluminum, as examples.

One straightforward approach to this problem has been to utilize copper or aluminum conductors of large cross-section for this purpose, or a plurality of smaller conductors in parallel with each other. One significant drawback of such arrangements is the cost of the material itself, which must be used in large quantities in order to provide the high-current carrying capacity required. Another drawback commonly arises in those frequent applications where it is necessary to provide branch-line connections, for example to supply current to a plurality of electrolytic cells from a common bus, or to provide suitable connections to switches for interrupting or diverting the current flow. Abrupt changes in direction of the conductor may also require connections which are difficult to make and maintain satisfactorily.

It has been proposed previously to provide a high current-carrying conductor comprising an outer casing or sheathing filled with sodium. The primary advantage of the sodium conductor is its lower cost compared with copper, and in general its low cost for a given current-carrying capacity compared to other commonly-used conductor materials. Because of its high chemical activity, the sodium should in general be protected from the surrounding environment, particularly from the oxygen and moisture normally present in ambient air. To this end, it has been proposed previously to utilize a hermetically-sealed casing for the sodium, the sodium being introduced into the casing in molten form to fill the casing, after which the casing is hermetically sealed closed. Tests conducted previously and reported in the prior art have shown the ability of such a conductor to carry high currents at a reduced cost for the conductor per foot of length thereof. Also, by making the casing in the configuration desired for the particular installation and then filling it with the molten sodium, after solidification the sodium conductor provides the desired shape including any necessary sharp bends or angles. Such a conductor and methods for making it are described, for example in an article entitled "A 4,000-Ampere Sodium Conductor" by R. H. Boundy appearing at Electrochemical Society Journal, volume 62, pages 151–160 (1932).

However, such sodium-filled conductors have not heretofore enjoyed substantial commercial use. One problem inhibiting such use has been the difficulty of providing reliable low-resistance electrical terminals capable of carrying very high currents. It will be appreciated that at some point in the normal electrical circuit it will generally be important or essential to provide a connection from the sodium-filled conductor to the more usual copper or aluminum bus, for example. Typically, copper terminations are desirable at each of the opposite ends of the sodium-filled conductors; and where it is desired to provide tap connections or branch lines along the sodium-filled conductor, it may also be desirable to provide appropriate additional terminations. For example, if a sodium-filled conductor is to be used as a bus connected at its opposite ends to normal copper or aluminum bus, and if intermediate points on the conductor are to be connected to branch lines such as lines leading to individual electrolytic cells or to switches, then a plurality of reliable low-resistance terminations will be required for the sodium-filled conductor.

Various approaches have been proposed in the prior art for providing such terminations. For example, it has been proposed to force a copper wedge into the sodium at the end of a sodium-filled conductor, or to screw a copper or other low-resistivity conductor into one end of the sodium. Various types of pressure clamps have been proposed and tried for making connection to the sodium, and it has also been proposed to use amalgams at the interface between the sodium and the termination. Typical of these earlier approaches are those described in the following: U.S. Pat. No. 3,389,460 of Rubenstein et al.; U.S. Pat. No. 3,370,344 of Needham et al.; U.S. Pat. No. 3,369,072 of Harris et al.; U.S. Pat. No. 3,346,-690 of McNerney; and the above-identified article by R. H. Boundy. Despite these efforts to provide suitable connections, it appears that in a system utilizing a sodium-filled conductor with terminations thereto, the connection between the termination and the sodium has constituted the highest resistance portion of the conductor system, and that this termination contact-resistance is not only substantial but also quite variable from conductor-to-conductor and even in the same conductor under different operating conditions at different times.

Accordingly, it is an object of the invention to provide a new and useful method for the fabrication of alkali metal-filled conductors having low-resistivity terminations connected thereto.

A further object is to provide such a method in which the contact produced between the termination and the alkali metal is of low resistivity and high current-carrying capacity.

A further object is to provide such a method which is also reliable, reproducible and easily performed.

It is also an object to provide a method for fabricating a sodium-filled conductor having a ferrous-metal casing and copper or aluminum terminations in reliable low-resistance contact with the sodium.

BRIEF SUMMARY OF THE INVENTION

These and other objects and features of the invention are achieved by the provision of a method of fabricating an alkali-metal filled high-current carrying electrical conductor or bus having a low-resistance termination for enabling external connection thereto, comprising providing a casing of a material suitable for retaining molten alkali metal and suitable for protecting alkali metal from the surrounding environment, providing an insert of a material of low electrical resistivity and high-current carrying capacity extending through and sealed to a wall of said casing, introducing molten alkali metal into said casing to fill said casing and to immerse, in said molten alkali, metal surfaces of said insert which are exposed to the interior of said casing, and thereafter cooling said alkali metal to solidify it in said casing and to provide an intimate contact between said solidified alkali metal and said surfaces of insert, whereby the portion of said insert extending on the outside of said container comprises an external termination in low-resistance connection to said solidified alkali metal in said casing.

It has been found that not only is a satisfactory sodium conductor of the desired low resistivity and longevity thereby produced, but in addition the insert of low electrical resistivity then comprises an electrical termination in low-resistance, high-current-carrying contact with the alkali metal in the casing and is formed readily and reproducibly as part of the simple process set forth above.

In one specific aspect of the invention, low-resistance copper or aluminum terminations are provided to a sodium-filled conductor having a ferrous metal casing by first welding the copper or aluminum inserts to a support or closure which is small compared to the casing and of a material which is readily weldable to the casing, then placing the closure or support so as to cover an opening in the casing with the insert extending through it, and finally welding the periphery of the insert or closure to the casing, whereby the desired configuration and hermetic sealing is provided despite the normal difficulty of welding copper to ferrous metals.

In the preferred form of the invention, the casing with insert affixed and hermetically sealed thereto is provided with openings along the top through which molten alkali metal is flowed into the interior of the casing in an inert atmosphere and while the casing is held at a temperature above the melting point of the alkali metal, the casing having been cleaned immediately prior to introduction of the alkali metal to remove undesirable oxides. After cooling of the casing and alkali metal to solidify the alkali metal which is in the casing and in contact with the low-resistivity inserts, the fill openings are hermetically closed to provide a low-resistivity alkali-metal filled conductor having low resistivity, high-current carrying terminations, with the sodium protected from the surrounding ambient environment.

BRIEF DESCRIPTION OF FIGURES

Other objects and features of the invention will be more readily understood from a consideration of the following detailed description, taken in connection with the accompanying drawings in which:

FIG. 8 is an elevational view, with electrical connections thereto shown schematically, showing the conditions under which the alkali metal is flowed into the casing in the preferred embodiment of the invention;

FIG. 9 is a sectional view taken along lines 9—9 of FIG. 8;

FIG. 10 is a partial elevational view, with parts broken away, of a finished alkali metal-filled conductor with low-resistivity terminations constructed in accordance with the steps of the invention;

FIG. 11 is a sectional view taken along lines 11—11 of FIG. 10; and

FIG. 12 is a perspective view to which reference will be made in explaining a preferred series of steps in accordance with the invention as applied to the provision of electrical terminations extending transversely to the axis of the alkali metal-filled conductor.

DESCRIPTION OF SPECIFIC EMBODIMENTS

Figure 1:
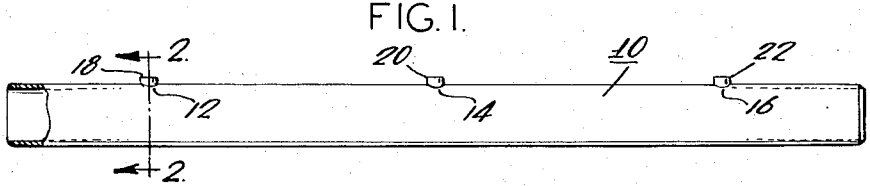
FIG. 1 is an elevational view, with parts broken away, showing one form of casing suitable for use in practicing the invention.
Figure 2:
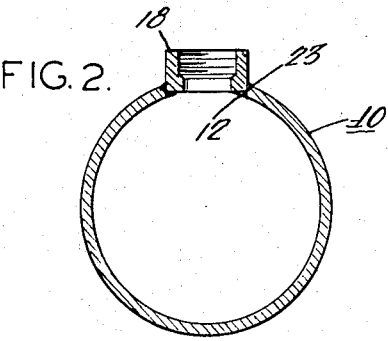
FIG. 2 is a sectional view taken along lines 2—2 of FIG. 1.

Referring now to the drawings which illustrate, by way of example only, one specific preferred manner of practicing the invention, FIG. 1 shows a casing 10 in a form of a cylindrical open-ended pipe having three longitudinally spaced-apart openings 12, 14 and 16 along its top surface and having three internally-threaded sleeves 18, 20 and 22, respectively, welded into said openings by welds such as 23. In this example the casing is assumed to be a ferrous metal, such as iron or steel pipe, although other materials may be used.

Figure 3:
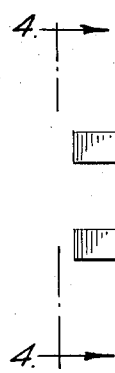
FIG. 3 is a side elevational view of an insert subassembly constructed in accordance with one preferred step of the invention.
Figure 4:
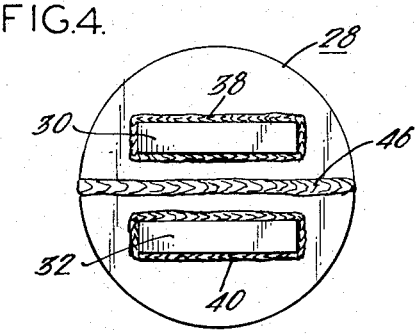
FIG. 4 is a view taken along lines 4—4 of FIG. 3.

FIGS. 3 and 4 show an insert sub-assembly, one of which is inserted into each of the opposite ends of the casing 10. This sub-assembly comprises a closure 28 in a form of a circular ferrous plate 28 carrying a pair of parallel, generally-rectangular inserts 30 and 32 of a low-resistivity material such as copper, extending through a pair of corresponding generally-rectangular openings 34 and 36, respectively, in the closure 28. In this example, the copper inserts 30 and 32 extend at right angles to the plane of the closure plate 28, and are held thereto in hermetic sealed relation by means of the full-penetration peripheral welds 38 and 40, extending entirely around the periphery of each of the inserts and sealing each insert to the closure. The inserts 30 and 32 will ultimately serve as low-resistance terminations at one end of the alkali metal-filled conductor or bus, and a similar sub-assembly comprising a further pair of inserts is also provided for the opposite end of the casing 10.

The desired hermetic welding between the closure 28 and the inserts 30 and 32 is provided by preheating the closure 28 and each of the inserts 30 and 32 with a torch in an inert atmosphere such as argon, after cleaning them of undesirable oxides, then subsequently performing the welding, preferably also in an inert atmosphere such as argon. More particularly, the welding may be accomplished by conventional means, utilizing a copper electrode in an electric-arc welding system, the electrode being shielded so that a cylindrical flow of argon gas is continuously provided around the outside of the electrode and onto the workpiece being welded. Since the closure 28 is much smaller than the casing 10, its heat- dissipating effects during welding are much less, and the high temperatures necessary for accomplishing the desired full-penetration hermetic welding and sealing are thereby enabled, in contrast to the difficulties commonly encountered if the closure is first secured to the casing 10 and an attempt then made to weld the inserts into the closure. As is seen particularly clearly in FIGS. 3 and 4, the edges of the rectangular openings through the closure 28 are preferably beveled to provide the desired full-penetration welding, and welding is provided on both sides of the closure 28.

Figure 5:
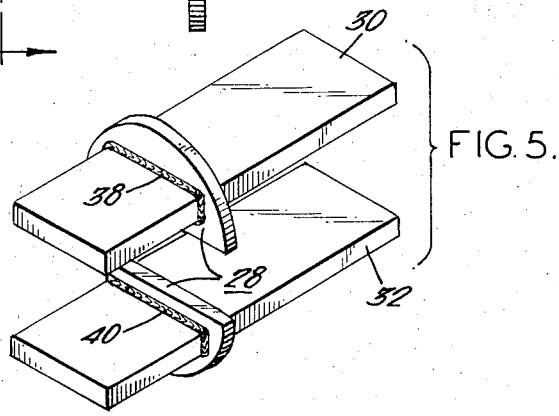
FIG. 5 is a perspective view showing the insert subassembly of FIG. 4 at an intermediate step in its fabrication.

In this specific embodiment of the invention it was found desirable to cut the closure 28 in half along a diameter parallel to the rectangular slots, prior to welding of the inserts. This enabled more ready access of the welding equipment to all sides of the inserts, and also provided an even smaller mass of the closure during the welding so as to further enhance the reliability of the welding. FIG. 5 shows the closure in its bisected condition, with the inserts welded in place, after which the two halves of the closure 28 are aligned with each other and welded together again along the seam line 46 by ordinary arc welding.

Figure 6:
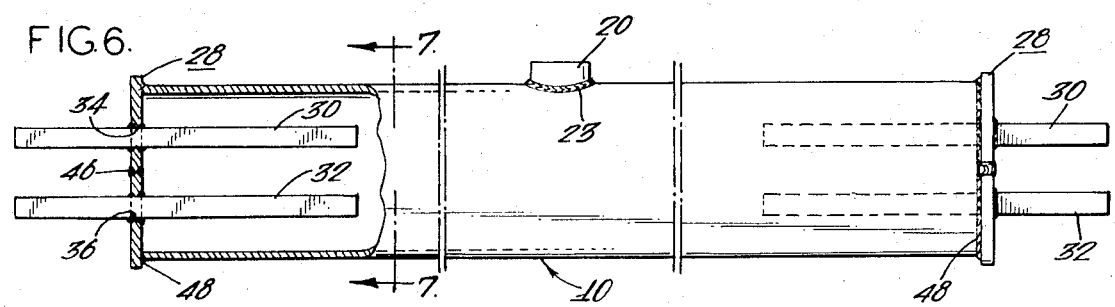
FIG. 6 is an elevational view showing a casing with the insert sub-assembly sealed thereto in position for receiving molten alkali metal during a later step in the process of the invention.
Figure 7:
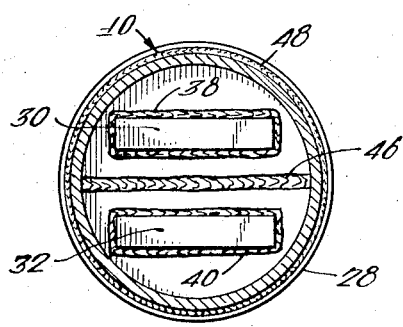
FIG. 7 is a sectional view taken along lines 7—7 of FIG. 6.

The completed closure 28 is then placed in position to close one of the open ends of the casing 10, and so that the two inserts 30 and 32 extend from the interior to the exterior of the casing substantially along the axis of the casing, as shown in FIG. 6. The periphery of the closure is then welded at 48 to the casing 10 by ordinary arc welding, which can readily be accomplished since the two materials being welded are both ferrous metals in this example.

The assembly shown in FIG. 6 is next cleaned internally to remove oxides from the interior surfaces thereof, preferably by sandblasting and is then assembled in the arrangement illustrated in FIG. 8, with the three sleeves 18, 20 and 22 extending directly upwardly. The casing is heated above the melting point of sodium by means of three electrical resistance heaters 52, 54 and 56 spaced along, and in contact with, the outer surface of the lower side of the casing. Current for the heaters is supplied from alternating-current power lines 58 and 60. Before such heating, the casing is preferably wrapped with a heat-insulating blanket 64 of glass fibers or the like, and is throughly flushed with an inert gas such as nitrogen before the liquid sodium is flowed into the casing.

To facilitate this procedure, nitrogen supply tubes 70, 72 and 74 are provided, one for each of the corresponding sleeves 18, 20 and 22. For one example, after the casing had been heated to a temperature of about 140° C. and the copper inserts had reached a temperature of about 125° C., the interior of the casing was purged with pure nitrogen for about one-half hour by introducing the nitrogen supply tubes 70 and 74 into sleeves 18 and 22, respectively, to produce a flow of nitrogen through the casing and outward through sleeve 20, thereby removing air and preventing the formation of undesirable oxides on the interior surfaces of the casing and inserts. A liquid-sodium supply tube 80 connected at its remote end to a suitable tank of pure molten sodium is placed within the outer end of the sleeve 20, and sodium is then permitted to flow into the interior of the casing while nitrogen continues to flow into the casing through the sleeves 18 and 22; at the same time, a stream of nitrogen from supply tube 72 is directed over sleeve 20 to minimize contact of the entering molten sodium with air. The casing is thereby filled with the molten sodium until the molten sodium rises part way in the sleeves 18, 20 and 22, the nitrogen tubes being withdrawn slightly to permit such rise of the sodium level. The nitrogen streams are then directed against the top surfaces of the sodium in the three sleeves, and the electrical heaters turned off. A short time later, while the sodium is still liquid, three plugs such as 84 (FIG. 11) are screwed into the three sleeves 18, 20 and 22, the threads of the plugs preferably having been provided with a liquid sealant material which, when hardened, ensures a hermetic seal along the threads. Some twenty hours later the insulating blanket 64 may be removed, at which time the casing is typically still somewhat above room temperature but the sodium is solid with the casing. It will be understood that hermetic closure may be accomplished in other ways, for example using unthreaded sleeves and plugs, or by using welding to effect the desired hermetic closure.

The resultant structure, shown particularly clearly in FIGS. 10 and 11, comprises a hermetically sealed container provided by the original casing 10 with its end closures and parts, which is filled with solid sodium in which the four terminations, two at each end of the casing, are embedded in low-resistance electrical contact.

The resultant structure is highly resistance to deterioration with time due to its hermetic sealing from the ambient environment, and exhibits a very low electrical resistance between each termination and the sodium in the casing. Resistance of the entire structure between the terminations at its opposite ends is also very low, being substantially the same as that calculated for the assembly of materials used assuming zero contact resistance. The structure is therefore not only possessed of highly desirable mechanical, chemical and electrical properties, but the electrode arrangement and the entire assembly are provided in a reproducible and quite simple manner.

FIG. 12 illustrates one alternative arrangement by which a pair of identical terminations may be provided so as to extend through the side walls of the casing, generally perpendicular to the axis thereof. As shown, a small, curved, insert support 88 carries a generally-rectangular copper insert 90 extending through, and hermetically welded to, the support. This subassembly is adapted to be positioned so that the insert 90 extends transversely into the casing 91, and so that the support 88 closes the opening 92 through which the insert extends, after which the support is welded to the casing. The indentical support 93 and insert 94 are shown already installed in casing 91, the support 93 being welded around its periphery, as at 95, to the exterior of the casing 91, thereby to provide a hermetic seal. The steps used to weld the inserts to the supports and the supports to the casing may be like those described hereinbefore with reference to the end closures and terminations. Also, the steps for applying the end closures and their inserts, and the subsequent procedures for filling the casing with sodium to form a suitable conductor, may be like those previously described with respect to the fabrication of the structure of FIGS. 10 and 11. When completed, the apparatus described with reference to FIG. 12 then provides not only the end terminations such as are shown in FIGS. 10 and 11, but also provides transverse branch connections by way of the termination inserts 90 and 94 suitable, for example, for connection to each of a plurality of electrolytic cells or the like.

It will therefore be appreciated that there has been provided a method for fabricating an alkali metal-filled conductor having one or more low-resistivity terminations for providing low-resistance connection to the sodium from the exterior, in which the total resistance of the conductor, and especially the resistance between each termination and the alkali metal, is reproducibly and reliably low, which method requires only a small number of relatively simple steps. A method is also provided for fabricating such a structure having a casing of a material which is relatively difficult to weld to the material of the inserts by welding the inserts first to a closure or support of a metal which is readily welded to the casing material and which is small in size compared with the casing, and then welding the closure or insert support to the casing.

Various other materials can be utilized for making conductors and terminations by the process of the invention. Such other suitable materials include, but are not limited to, lithium and potassium, although sodium is preferred because of its cheapness and excellent electrical conductivity. Other materials may also be used for the insert, for example aluminum, but copper is preferred because of its higher electrical conductivity. The casing may also be of any of a large variety of materials, although steel pipe is cheap and commonly available and therefore desirable in many practical applications. Similarly, the details of the supplying of the molten alkali metal to the interior of the casing and the procedures for the heating, cooling and purging of the casing may be varied substantially without departing from the invention, as may be the details of the welding or sealing procedure.

Without thereby in any way limiting the scope of the invention, the following specific values of parameters of the process utilized in one particular case to fabricate the conductor shown in FIGS. 10 and 11 are given in the interest of complete definiteness.

In this example, a 12-foot length of circularly-cylindrical steel pipe having an outer diameter of about 8.626 inches and an inner diameter of about 7.981 inches was provided with three fill sleeves, each about one inch in height and having an inner diameter of about two inches, one of the fill sleeves being centered along the length of the pipe and the other two being spaced on opposite sides of it by about 4 feet. Both ends of the pipe were beveled to facilitate formation of full-penetration welds to the two closures 28. Each closure 28 comprised a circular steel plate one-half inch in thickness and 9½ inches in diameter. Each of the terminations such as 30 and 32 was of copper one-half inch in thickness, of generally rectangular form, about 18 inches in length, and extended about six inches on the exterior side of its associated closure 28. The two terminations on a given closure were mounted at right angles to the plane of the closure with about 3½ inches between their centers. Each heater for the casing provided about 1,000 watts of electrical heating power, and heated the casing for about 17 hours, after which the interior of the casing was purged for about a half hour before the molten sodium was delivered to it. After filling of the casing with sodium, the heaters were turned off, and one hour later the plugs such as 84 were inserted into the fill sleeves. Twenty hours after filling, the insulation was removed. The total electrical resistance measured from the two terminations at one end of the conductor to the two terminations at the opposite end thereof was less than about $0.4 \times 10^{-6}$ ohms per foot, e.g. less than about $5 \times 10^{-6}$ ohms for the entire 12-foot long conductor including the termination contacts.

In this connection it is noted that the sodium-filled conductor is preferably operated at temperatures below that at which the sodium would re-melt, since the resistance of the sodium tends to increase with temperature and to be higher when molten. With the specific form of conductor described above, ten thousand amperes of current may readily be passed through the conductor and will produce a temperature rise of the sodium of about 10 to 20 degrees centigrade above room temperature, i.e. a temperature generally well below the melting point of the sodium.

While the invention has been described with particular reference to specific embodiments thereof in the interest of complete definiteness, it will be understood that it may be embodied in a variety of forms diverse from those specifically shown and described without departing from the scope of the invention as defined by the appended claims.

What is claimed is:

1. The method of fabricating an alkali metal-filled high-current carrying electrical bus having a low-resistance termination for enabling external connection thereto, comprising:

providing a ferrous metal casing suitable for retaining molten alkali metal and suitable for protecting alkali metal from the surrounding environment;

providing a non-alkali metal insert of a material of low electrical resistivity and high-current carrying capacity extending through an aperture in a closure of a material which is readily weldable to the ferous metal casing but more difficult to weld to the insert material, said insert welded to the closure with the insert extending therethrough and the closure welded to a wall of said casing with the insert extending from the exterior to the interior of said casing;

introducing molten alkali metal into said casing to fill said casing and to immerse in said molten alkali metal the surfaces of said insert which are exposed to the interior of said casing; and thereafter cooling said alkali metal to solidify it in said casing and to provide an intimate contact between said solidified alkali metal and said surfaces of said insert, whereby the portion of said insert extending on the outside of said casing comprises an external termination in low-resistance connection to said solidified alkali metal in said casing.

2. The method of claim 1, in which said insert is of copper or aluminum.

3. The method of claim 2 in which said insert is of copper.

4. The method of claim 1 in which said alkali metal is sodium.

5. The method of claim 1 wherein said closure is also ferrous metal.

6. The method of claim 1, in which an aperture is provided in a wall of said casing prior to introduction therein of said molten alkali metal, a closure is formed for said aperture of a metal readily weldable to said casing but less readily weldable to the material of said insert, said closure being small compared with said casing, said insert is welded to said closure in a position in which said insert extends through said closure, and then said closure is welded to said casing in a position to close said aperture and with said insert extending from the exterior to the interior of said casing.

7. The method of claim 6, in which said casing and said closure are both of ferrous metal, and said insert is of copper.

8. The method of fabricating a sodium-filled high-current carrying bus having a low-resistance high-current carrying termination for enabling external connection thereto, comprising:

providing a generally-cylindrical ferrous-metal outer casing suitable for retaining molten sodium;

providing an insert of copper extending through an aperture in a closure of a material which is readily weldable to the ferrous metal casing but more difficult to weld to copper, said copper insert sealed to the closure with the insert extending therethrough and the closure sealed to a wall of said casing with the insert extending from the exterior to the interior of said casing;

providing at least two openings along the same side of said casing;

cleaning the interior surface of said casing to remove oxides therefrom;

thereafter, and without permitting appreciable reformation of oxides on the interior surface of said casing, positioning said casing with said openings upward, and then flowing molten sodium through one of said openings into said casing while maintaining a flow of inert gas through the unfilled portion of said casing and while maintaining said casing at a temperature above the melting point of sodium, until said casing is filled and the portion of said insert inside said casing is immersed in said molten sodium;

cooling said casing and said molten sodium therein to solidify said sodium and to provide intimate low-resistance contact between the solidified sodium and the portion of said insert within said casing; and closing all openings through said casing after said casing is filled with sodium.

9. The method of claim 8, in which said providing of said insert of copper comprises providing an insert support of a material readily weldable to ferrous metal and small compared with said casing, providing at least one aperture through said support, positioning said insert in said aperture so as to extend through said support, welding said insert to the surrounding portion of said support to provide a hermetic seal thereto, providing an insert-receiving opening in said casing, positioning said support in said insert-receiving opening with said insert welded thereto and extendng from the interior to the exterior of said casing, and welding said support, while so positioned, to said casing to provide a hermetic seal thereto.

10. The method of fabricating an alkali metal-filled high-current carrying electrical bus having a low-resistance termination for enabling external connection thereto, comprising:

providing a ferrous metal casing suitable for retaining molten alkali metal and suitable for protecting alkali metal from the surrounding environment;

providing a non-alkali metal insert of a material of low electrical resistivity and high-current carrying capacity extending through an aperture in a closure of a material which is readily weldable to the ferrous metal casing but more difficult to weld to the insert material, said insert sealed to the closure with the insert extending therethrough and the closure sealed to a wall of said casing with the insert extending from the exterior to the interior of said casing;

introducing molten alkali metal into said casing to fill said casing and to immerse in said molten alkali metal the surfaces of said insert which are exposed to the interior of said casing by flowing said alkali metal into said casing through a first opening therein while passing a stream of inert gas into and out of said casing through a second and a third opening in the wall of said casing, and thereafter cooling said alkali metal to solidify it in said casing and to provide an intimate contact between said solidified alkali metal and said surfaces of said insert, whereby the portion of said insert extending on the outside of said casing comprises an external termination in low-resistance connection to said solidified alkali metal in said casing.

References Cited

UNITED STATES PATENTS

| 3,507,976 | 4/1970 | Thompson et al. | 174—DIG. 7 |
| 833,290 | 10/1906 | Betts | 174—DIG. 7 |
| 3,347,977 | 10/1967 | Hus et al. | 174—DIG. 7 |
| 3,349,832 | 10/1967 | Crowdes et al. | 174—DIG. 7 |

FOREIGN PATENTS

| 655,342 | 4/1929 | France | 174—DIG. 7 |
| 1,459,666 | 10/1966 | France | 174—DIG. 7 |

OTHER REFERENCES

"A 4,000-Ampere Sodium Conductor," R. H. Boundy, Transactions of the Electro-Chemical Society, September 1932, pp. 151–160.

H. A. KIRBY, JR., Primary Examiner

174—Dig. 7